US008628083B2

(12) United States Patent
Smith

(10) Patent No.: US 8,628,083 B2
(45) **Date of Patent: *Jan. 14, 2014**

(54) GAMING MACHINE WITH REELS

(71) Applicant: Aristocrat Technologies Australia Pty Limited, North Ryde (AU)

(72) Inventor: Robert John Smith, Balmain (AU)

(73) Assignee: Aristocrat Technologies Australia PTY Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,265

(22) Filed: Jan. 24, 2013

(65) Prior Publication Data

US 2013/0134671 A1 May 30, 2013

Related U.S. Application Data

(63) Continuation of application No. 13/074,712, filed on Mar. 29, 2011, now Pat. No. 8,382,110, which is a continuation of application No. 12/277,893, filed on Nov. 25, 2008, now Pat. No. 7,942,417.

(30) Foreign Application Priority Data

Nov. 27, 2007 (AU) ................................ 2007906465

(51) Int. Cl.
*G07F 17/34* (2006.01)
*A63F 13/00* (2006.01)

(52) U.S. Cl.
USPC ................. 273/143 R; 273/138.2; 273/138.1; 463/20; 463/46

(58) Field of Classification Search
USPC ............... 273/143 R, 138.2, 138.1, 309, 292; 463/20, 46
See application file for complete search history.

(56) References Cited

U.S. PATENT DOCUMENTS

| | | | |
|---|---|---|---|
| RE35,182 | E | 3/1996 | Howard |
| RE35,188 | E | 3/1996 | Howard |
| 6,605,000 | B2 | 8/2003 | Adams |
| 6,811,273 | B2 | 11/2004 | Satoh et al. |
| 6,827,646 | B2 | 12/2004 | Adams |

(Continued)

FOREIGN PATENT DOCUMENTS

| | | |
|---|---|---|
| CA | 2526136 | 12/2004 |
| EP | 0688002 | 12/1995 |

(Continued)

OTHER PUBLICATIONS

United States Patent and Trademark Office, “Notice of Allowance,” issued in connection with U.S. Appl. No. 12/277,893, mailed on Feb. 4, 2011, 10 pages.

(Continued)

*Primary Examiner* — Benjamin Layno
(74) *Attorney, Agent, or Firm* — Hanley, Flight and Zimmerman, LLC

(57) ABSTRACT

Certain embodiments of the present invention relate to gaming machines having mechanical reels. The machine is adapted so that the reels to some extent protrude from the front face of the machine to enhance the user’s awareness that the reels are genuine and, optionally, the reels may have side walls having matching indicia to the symbols on the periphery of the reels. The reels may also be observed from front and rear sides of the machine or alternatively, rotated about an upright axis to enable a player to observe front and rear outcomes from one point.

24 Claims, 3 Drawing Sheets

(56) References Cited

U.S. PATENT DOCUMENTS

| | | | |
|---|---|---|---|
| 6,942,571 | B1 | 9/2005 | McAllister et al. |
| 7,033,272 | B1 | 4/2006 | Mason |
| 7,329,181 | B2 | 2/2008 | Hoshino et al. |
| 7,331,858 | B2 | 2/2008 | McComb et al. |
| 7,381,133 | B2 | 6/2008 | Thomas |
| 7,452,276 | B2 | 11/2008 | Loose et al. |
| 7,485,039 | B2 | 2/2009 | Okada |
| 7,708,640 | B2 | 5/2010 | Burak et al. |
| 7,942,417 | B2 | 5/2011 | Smith |
| 2003/0060269 | A1 | 3/2003 | Paulsen et al. |
| 2004/0048650 | A1 | 3/2004 | Mierau et al. |
| 2004/0102244 | A1 | 5/2004 | Kryuchkov et al. |
| 2004/0229678 | A1 | 11/2004 | Onuki et al. |
| 2004/0251625 | A1 | 12/2004 | Okada |
| 2005/0032571 | A1 | 2/2005 | Asonuma |
| 2005/0054422 | A1 | 3/2005 | Rothkranz et al. |
| 2005/0096123 | A1 | 5/2005 | Cregan et al. |
| 2005/0164788 | A1 | 7/2005 | Grabiec |
| 2006/0183532 | A1 | 8/2006 | Jackson |
| 2006/0247002 | A1 | 11/2006 | Yoshimi et al. |
| 2006/0287060 | A1 | 12/2006 | Yoshimi |
| 2007/0060296 | A1 | 3/2007 | Yoshizawa |
| 2009/0189345 | A1 | 7/2009 | Smith |
| 2011/0177860 | A1 | 7/2011 | Smith |

FOREIGN PATENT DOCUMENTS

| | | |
|---|---|---|
| EP | 1477945 | 11/2004 |
| EP | 1477946 | 11/2004 |
| EP | 1571612 | 9/2005 |
| EP | 1571615 | 9/2005 |
| EP | 1571616 | 9/2005 |
| EP | 1571621 | 9/2005 |
| EP | 1571626 | 9/2005 |
| EP | 1575008 | 9/2005 |
| GB | 2380844 | 4/2003 |
| GB | 2405737 | 3/2005 |
| GB | 2429657 | 3/2007 |
| WO | 0020082 | 4/2000 |

OTHER PUBLICATIONS

United States Patent and Trademark Office, "Non-Final Office Action," issued in connection with U.S. Appl. No. 12/277,893, mailed on Oct. 1, 2010, 28 pages.

United States Patent and Trademark Office, "Notice of Allowance," issued in connection with U.S. Appl. No. 13/074,712, mailed on Oct. 30, 2012, 19 pages.

United States Patent and Trademark Office, "Non-Final Office Action," issued in connection with U.S. Appl. No. 13/074,712, mailed on Apr. 2, 2012, 22 pages.

The Price is Right Featuring Plinko, iGame-Plus Series Brochure, IGT, 2001.

GAMING MACHINE WITH REELS

CROSS-REFERENCE TO RELATED APPLICATIONS

The present application claims, as a continuation, the benefit of priority to U.S. patent application Ser. No. 13/074,712, filed on Mar. 29, 2011, now U.S. Pat. No. 8,382,110, which claims the benefit of priority, as a continuation, to U.S. patent application Ser. No. 12/277,893, filed on Nov. 25, 2008, now U.S. Pat. No. 7,942,417, which claims the benefit of priority to Australian Provisional Patent Application No. 2007906465, filed on Nov. 27, 2007, entitled "A GAMING MACHINE WITH REELS", each of which is herein incorporated by reference in its entirety.

FIELD OF THE INVENTION

The present invention relates to gaming machines and display devices for gaming machines incorporating rotating reels.

BACKGROUND OF THE INVENTION

Gaming machines with rotating reels have been popular for many years. Initially, the rotating reels were mechanical spinning reels housed inside the machine which were spun and randomly stopped to place images on the reels in alignment to determine payouts. Drive mechanisms for the reels have developed substantially overtime to the point where the rotation and, in particular, the stopped position of the reels is precisely controlled, and in turn, manages the allocation of payouts. More recently, electronic gaming machines have been used to simulate spinning reels using computer generated graphics and electronics. However notwithstanding the existence of electronic gaming machines, players are still attracted to, and enjoy, gaming machines having mechanical reels.

SUMMARY OF THE INVENTION

According to certain embodiments of the present invention there is provided a gaming machine including:

i) a plurality of rotating reels having an outer periphery on which images relating to a game being played on the machine are displayed; and ii) a wall section located adjacent to the reels, wherein at least two of the plurality of reels are mounted so that their outer periphery protrudes beyond at least a portion of the wall section adjacent to the reels.

An advantage of certain embodiments of the present invention is that the mechanical and tangible nature of the reels is made more evident, enhancing appeal and enjoyment for a player.

According to certain embodiments of the present invention there is also provided a display device for a gaming machine including:

i) a plurality of rotating reels having an outer periphery on which images relating to a game being played on the machine are displayed; and ii) a wall section located adjacent to the reels, wherein at least two of the plurality of reels are mounted so that their outer periphery protrudes beyond at least a portion of the wall section adjacent to the reels.

In an embodiment, at least one of the reels has a side wall oriented transversely to its outer periphery and one of the reels having the side wall extends or protrudes beyond at least a portion of the wall section so that at least part of the side wall of the respective reel is visible.

In an embodiment, at least two of the reels have at least one side wall. In an embodiment, each of the plurality of reels each include one of the side walls, and suitably two of the side walls.

In an embodiment, the wall section is in the form of one or more members disposed about the reels. According to one embodiment of the present invention, the members are in the form of flat or contoured panels. The contoured panels may recede backwardly away from the protruding outer periphery of the reels or, alternatively, the contoured panels may extend partly forward of the protruding outer periphery of the reels.

According to an alternative embodiment, the members may be in the form of linear beams such as C-shaped, D-shaped, I-shaped, or H-shaped sections that straddle the reels.

The wall section may also protrude or project outwardly from other front face sections or outside housing sections of the gaming machine. Similarly, the wall section may recede backwardly from the front face or the wall section may recede backwardly from the protruding outer periphery of the reels the gaming machine.

In an embodiment, the wall section forms a front face of the gaming machine which obscures from view the reels behind the wall section. In other words, only one side of the reels protruding forward of the reels can be observed.

In an embodiment, the reels are arranged in a side-by-side arrangement and the reels located at opposite ends of the arrangement have one of the side walls at outer ends of the arrangement of the reels.

In an embodiment, at least two of the reels are separated by a space or gap, and at least one of the spaced reels has at least one of the side walls of which at least a part is visible. In other words, in addition to the side walls of the end reels being visible, reels located intermediate the end reels may also have side walls that are visible.

The side walls may have any shape and profile including curved profiles, stepped profiles, corrugations, ribs or creases that are oriented as cords or radially. However, it is envisaged that the side walls may be substantially flat disks.

In an embodiment, the side walls extend from edges of the outer peripheral wall.

According to one embodiment, at least one of the reels, and suitably two or more of the reels each has two of the side walls.

The side walls may have any graphic art work and alternatively, the side walls include light sources, such as light emitting diodes (LEDs). The light source is a multi-coloured light source. The side walls may also include indicia that corresponds or matches with the images or symbols on the outer periphery of the reels. For example, the side wall(s) may include indicia in the form of one or more sectors that are aligned with the images on the outer wall.

Throughout this specification the term "sector" will be understood to mean a region defined by two lines which at one end extend from a point, such as two radii extending from the centre of a circle, and at the other end the lines are interconnected by an arc or arch, such as part of a circumference of the circle.

In an embodiment, the side walls also include indicia that compliments the images or symbols on the outer periphery of the reels. For example, in the situation in which the symbol on the outer periphery is a red or black card suit, the indicia on the side wall may be coloured black or red. Similarly, in the situation in which the images or symbols are fruit, indicia on the side walls may be coloured according to the colour of the fruit on periphery.

According to one embodiment, the plurality of reels are arranged in a linear relationship in which the reels are co-axially mounted relative to each other. According to an alternative embodiment, the reels are arranged on different axes. The axes may be horizontal, upright or laterally thereto. In either embodiment, the reels may be of uniform diameter or of at least two different diameters. In other words, the outer wall of the reels may extend or protrude from the reels by varying degrees.

In an embodiment, the furthest point of the periphery or peripheral wall of the reels protrudes past the wall section adjacent to the reels or the display opening of the housing by at least 30 mm, and suitably in the range of 40 to 300 mm. As an example, the reels protrude by approximately 200 mm.

In an embodiment, a transparent cover having a shape adapted to receive a portion of the reels protruding, extending or projecting from the wall section of the gaming machine.

In addition to protruding forwardly of the wall section, according to an alternative embodiment the reels can be observed or are visible from opposite sides of the wall section. It is envisaged that in an embodiment the reels extend or protrude from opposite sides of the wall section. In this situation, it is possible for separate games or a single game to be played based on the images on the reels on the front and rear of the reels. However, it is also possible for a single game to be player using the images on the front face of the reels only.

In addition to the reels being rotated during operation about a substantially horizontal axis, in the situation in which the reels project from opposite sides, the reels may also be moved about a upright axis so that the front and rear view of the reels can be observed or is visible without a player having to change position. When in use the reels are located in the stop position to determine the outcome of the game before being moved about the upright axis.

According to certain embodiments of the present invention there is also provided a gaming machine including:

i) a mechanical reel assembly including a plurality of rotating reels having an outer periphery or peripheral wall from which images relating to a game being played on the machine can be displayed, wherein at least one of the reels has a side wall oriented transversely to its outer peripheral wall; and ii) a structural assembly including a wall section located adjacent to the reels, wherein the reel having the side wall and at least one other of the plurality of the reels are mounted so as to extend or protrude beyond at least a portion of the wall section so that at least part of the side wall of the respective reel is visible.

According to certain embodiments of the present invention there is also provided a gaming machine including:

i) a mechanical reel assembly including a plurality of rotatably mounted reels each having an outer periphery or peripheral wall from which images are displayed, the reels having a plurality of stop positions for displaying images thereon to determine payouts or outcomes; and ii) a housing for containing working components of the gaming machine on the inside thereof, the housing including a display opening through which the reels extend or protrude so that at least part of the outer periphery or peripheral wall is disposed on an outside of the display opening and thus the housing.

According to certain embodiments of the present invention there is also provided a gaming machine including:

i) a mechanical reel assembly including a plurality of rotatably mounted reels each having an outer periphery or peripheral wall from which images are displayed, the reels having a plurality of stop positions for displaying the images to determine payouts or outcomes; and ii) a structural assembly including two side supports of which one is disposed either end of the reel assembly, the reels protruding or extending past the side supports such that images on opposite sides of the reels can be observed.

According to certain embodiments of the present invention there is also provided a display device for a gaming machine including:

i) a mechanical reel assembly including a plurality of rotatably mounted reels each having an outer periphery or peripheral wall from which images are displayed, the reels having a plurality of stop positions for displaying the images to determine payouts or outcomes; and ii) a structural assembly including two side supports of which one is disposed either end of the reel assembly, the reels protruding or extending past the side supports such that images on opposite sides of the reels can be observed.

BRIEF DESCRIPTION OF THE DRAWINGS

Certain embodiments of the present invention will now be described with reference to the accompany drawings, of which.

Figure 1:
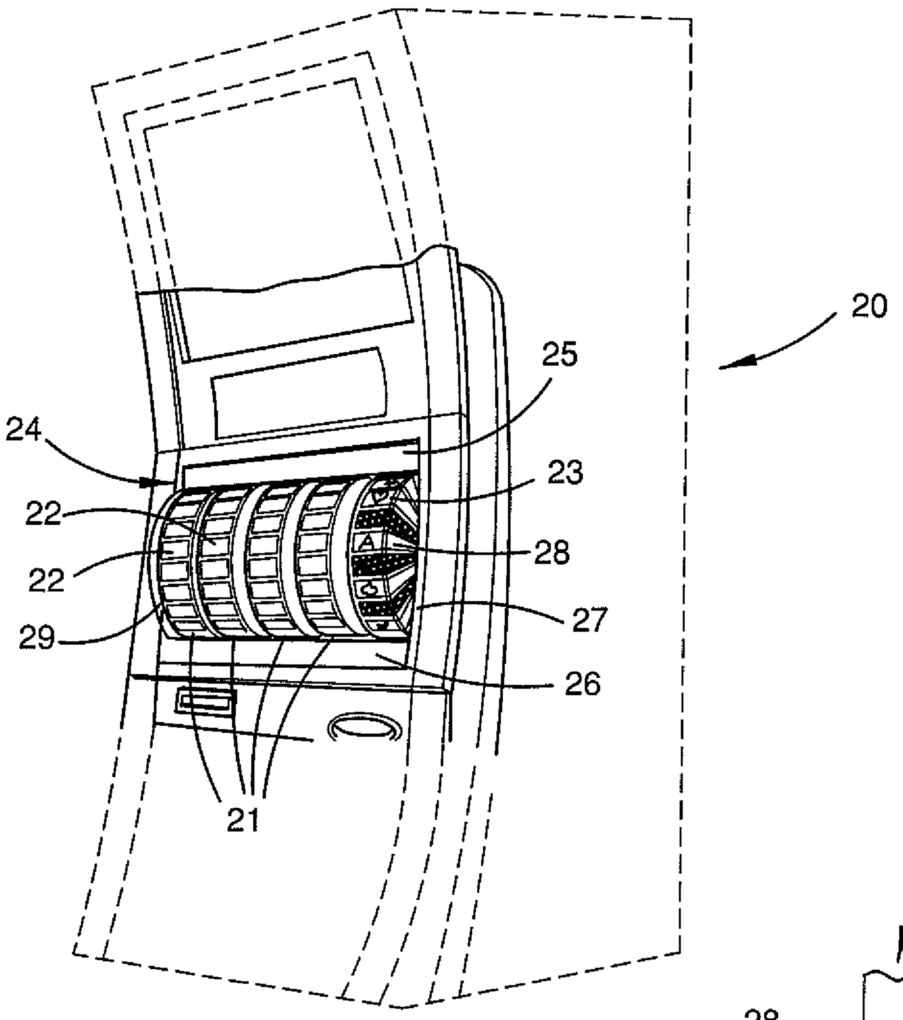
FIG. 1 is a perspective view of a gaming machine according to a first embodiment of the present invention in which a plurality of rotating reels and structural assembly in form of surrounding panels have been illustrated in a bold lines and the remainder of the gaming machine illustrated in a broken lines.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments of the present invention will now be described in detail with reference to the embodiments shown in the figures which relate to display devices for mounting rotating reels and gaming machines incorporating rotating reels. However, it will be appreciated that the display devices and gaming machines illustrated may incorporate many other features in addition to those mentioned in the following description including, for example, video display units, spinning wheels and any other interactive medium which may or may not be played in combination with a game being played on the rotating reels. Although not shown in the drawings, the reels are driven by a stepper motor that allows the reels to be moved through a series of incremental positions and, in particular, known stop positions. Operation of the stepper motor is control using suitable computer processors that determine the sequence and position of the images in the reels when in the stop position and, therefore, outcomes of a game.

With reference to the embodiment shown in FIG. 1, the gaming machine 20 includes a set of five rotating reels 21 each having an outer peripheral wall 22 in the form of a strip on which images 23 are displayed. The images 23 may be printed symbols or animations. Either separately or in combination with printed or projected images, it is also possible for the outer wall 22 to include a video screen, or windows in which one or more video screens are in registration when the reels 21 are located in a stop position. The video screens can be used to display desired images as determined by a computer processor.

The gaming machine also includes a structural assembly 24 in the form of a front face including upper and lower panels 25, 26 located above and below the rotating reels 21 and side panels 27 located to the left and right sides of the rotating reels 21. As can be seen in FIG. 1, each of the five rotating reels 21 protrude beyond the panels 25 to 27 defining the front face of the gaming machine 20 and are mounted co-axially and have equal diameters.

Figure 2:
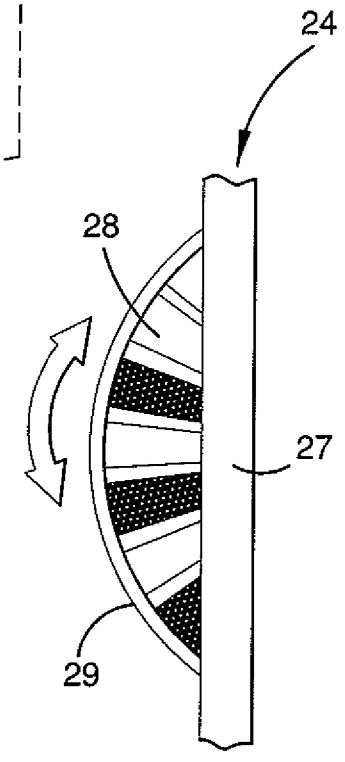
FIG. 2 is an enlarged side view of the rotating reel located at the right hand end of the gaming machine shown in FIG. 1.

An enlarged side view of right hand most reel 21 of gaming machine 20 in FIG. 2 and includes a side wall 28 in the form of a circular disc extending from an edge of the outer wall 22 which can be spun in the direction of the arrow shown. To enhance appeal to a player, the side wall 28 includes graphical features in the form of sectors, stripes or wedged shaped indicia which align with images on the outer face or strip of the reel 21. Although not shown in the figures, the side wall 28 of the reels 21 may also include light sources including multi-coloured light emitting diodes. Operation of the light sources may be controlled so as to project light in any sequence including sequences in association with spinning of the reels being started, stopped, during continuous spinning of the reels and on allocation of a payout being determined.

Although not shown in FIG. 1, the left hand most reel also includes a side wall 28 similar to the right hand most reel 21 as illustrated in FIGS. 1 and 2. Similarly, the reels 21 to the left of the right hand most reel 21 would also include images on the outer wall or strip 22.

In order to retain the spinning reels 21 in a secure environment to prevent tampering, a transparent cover 29 that is shaped to receive the protruding reels 21 is fitted over the reels 21 and secured to the face of the gaming machine 20. Ideally, the cover 29 also provides a liquid tight seal over the reels 21 yet does not detract from the visual appeal and ability for a player to detect that the reels 21 are physical tangible reels 21. In this respect, the cover 29 may be made from any suitable plastic material.

Figure 3:
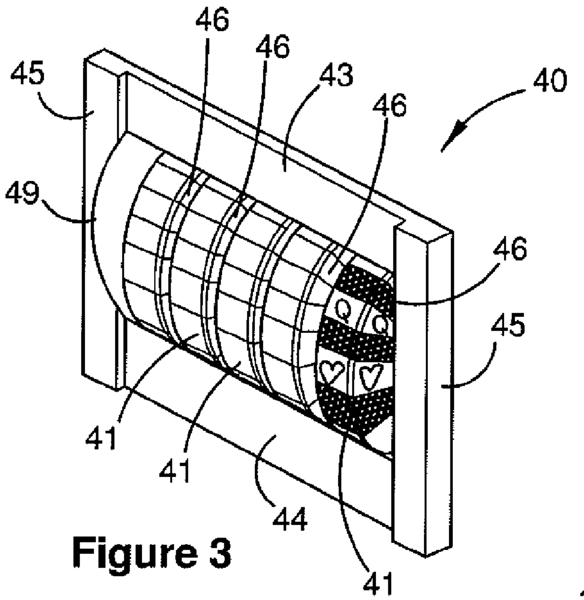
FIG. 3 is a perspective view of a display device for a gaming machine according to a second embodiment of the present invention, the display device including a plurality of reels and a structural assembly in a form of a frame around the rotating reels.

FIG. 3 illustrates a display device 40 for a gaming machine including a plurality of reels 41 protruding beyond a frame 42 including upper and lower face panels 43, 44 and two side panels 45 that surround the reels 41. One of the differences between the reels 41 shown in FIG. 3 and the reels 21 of the embodiment shown in FIGS. 1 and 2 is that each reel 41 includes one or more sides wall 46. In this situation, depending on the space in between the reels 41, the side walls 46 of each of the reels further enhances appeal and interest to a player. Extending over the front of the reels 49 is a plastic cover 49.

Figure 4A:
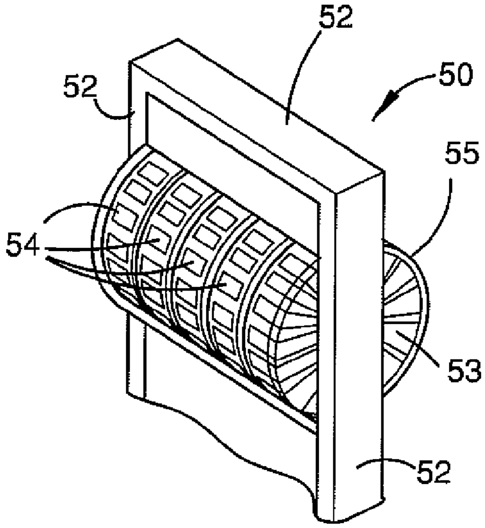
FIG. 4*a* is a perspective view of a display device for a gaming machine according to a third embodiment of the present invention, the display device including a plurality of rotating reels rotating about a horizontal axis and a thin profile structural assembly in the form of a frame in which the rotating reels project from opposite sides of the structural assembly.
Figure 4B:
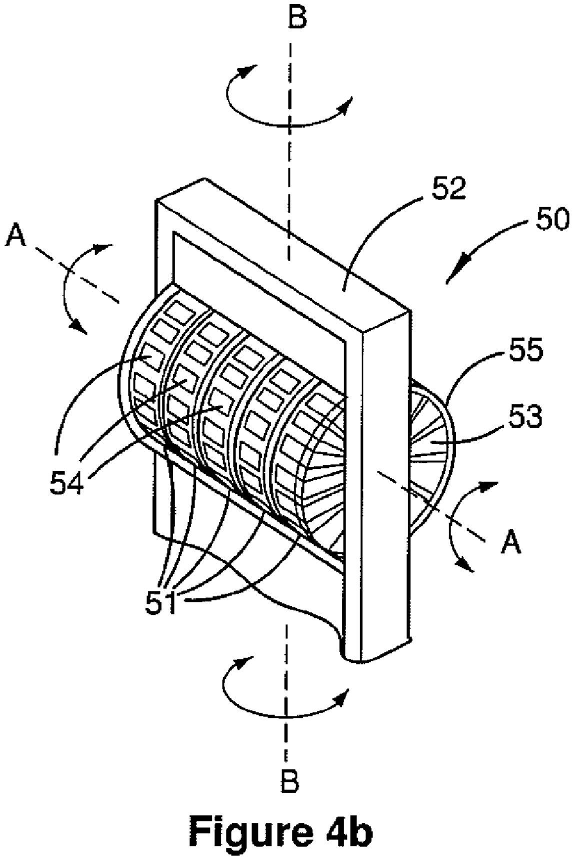
FIG. 4*b* is a perspective view of a display device for a gaming machine according to a fourth embodiment, the display device including a plurality of rotating reels rotating about a horizontal axis and one or more of the reels also rotating about an upright axis.
Figure 5:
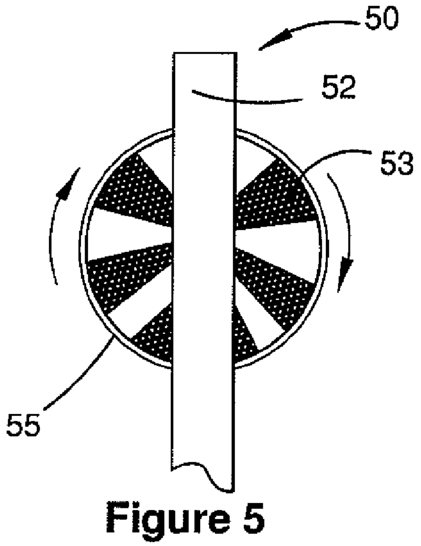
FIG. 5 is a side view of the display device shown in FIGS. 4*a* and 4*b;*

FIGS. 4*a*, 4*b* and 5 illustrate perspective and side views respectively of a display device 50 for a gaming machine including a plurality of reels 51 co-axial mounted within a frame 52. The frame itself has a thin profile such that the rotating reels 51 protrude from both sides. The right hand most reel 51 and, although not shown in the figures, the left hand most reel includes a disc shaped side wall 53 extending from the outer peripheral wall or strip 54. As described above in relating to the embodiments shown in FIGS. 1 to 3, the side walls 53 may include any graphical features including indicia in alignment with indicia associated with images on the outer peripheral wall, light sources or other video displays. Depending on the particular configuration of the gaming machine to which the display device is incorporated, it may be possible for separate games to be played on either the front or rear view of the reels 51 or a single game to be played on just the front view of the reels 51 either separately or in combination with the view of the images on the back side of the reels 51.

A plastic cover 55 preventing tampering of the reels 51 and providing a liquid tight seal is disposed over the reels 51 and fixed to the frame 52.

In addition, FIGS. 4*a* and 4*b* illustrate different features with respect to possible actions for rotating the reels. Specifically, as shown in FIG. 4*b*, the entire assembly of reels 41 is rotated about a substantially horizontal axis labelled by A-A. In addition, on or more of the reels 41, and suitably the entire assembly of reels 41 can also be rotated about upright axis labelled B-B. The advantages with this aspect of the invention is that a game can be played based on the outcome shown on the front and back views of the reels 41 by rotating the reels 41 about the axis B-B.

Figure 6:
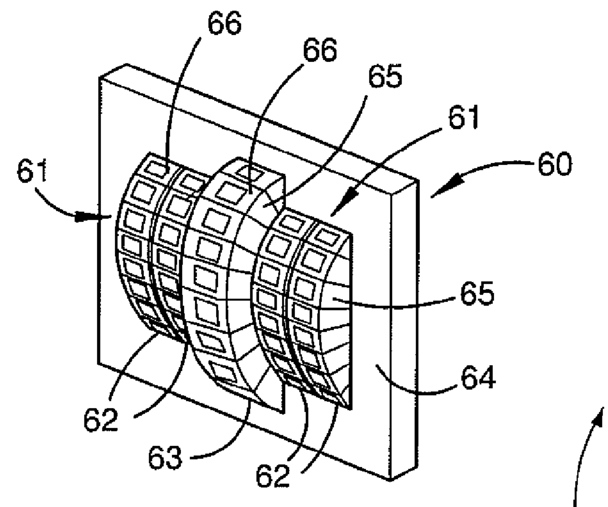
FIG. 6 is a perspective view of a display device for a gaming machine according to a fourth embodiment of the present invention, the display device including a plurality of rotating reels and a thin profile structural assembly in which the rotating reels project or extend by different amounts from opposite sides of the structural assembly.
Figure 7:
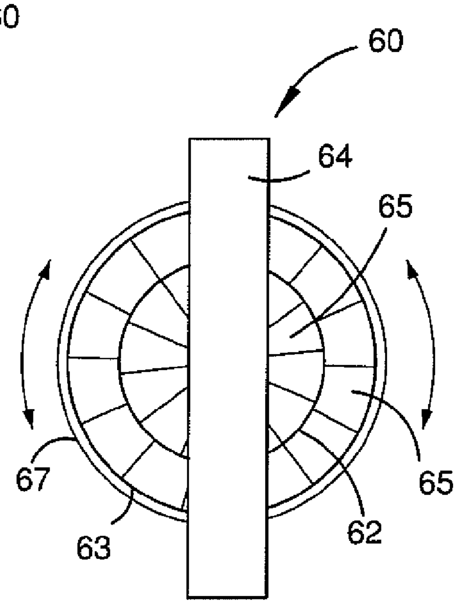
FIG. 7 is a side view of the embodiment shown in FIG. 6.

FIGS. 6 and 7 illustrate perspective and side views of a display device 60 for a gaming machine incorporating a set of reels 61 that protrude from the front face or frame 64 of the display device, wherein the reels include four small reels 62 of equal diameter and a fifth central reel 63 of larger diameter. The smaller reels 62 and the central larger reel 63 are co-axially mounted such that the large reel 63 protrudes further than the set of smaller reels 62 past the face of the display device 60. As can be seen in FIG. 6, the right hand most reel and the large central reel both include side walls 65 in the form of a disk located inside an outer peripheral wall or strip 66. As described above in relation to the embodiments in FIGS. 1 to 5, the side wall 65 may include graphical features including indicia corresponding or matching to indicia on the peripheral wall, lights or other video displays.

When in use, the reels 61 can be spun in the direction of the arrows shown in FIG. 7 and when stopped, the allocation of payouts may be determined based on the alignment of images from one or both sides of the reels 61.

Although not shown in FIGS. 6 and 7, it would also be possible for the reels 61 to be mounted on difference axes, for example, such that the outer peripheral wall or strip 66 of the larger reel 63 coincide at a common plane with the peripheral wall of the smaller reel 62.

A plastic cover 67 preventing tampering of the reels 61 and providing a liquid tight seal is disposed over the reels 61 and fixed to the frame 64.

Figure 8:
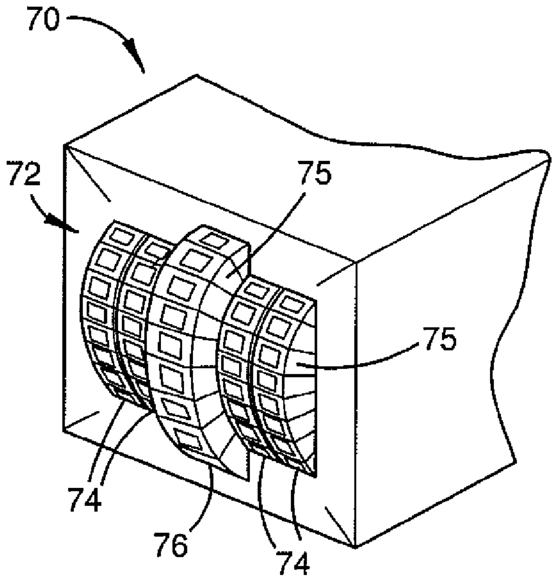
FIG. 8 is a perspective view of a display device for a gaming machine according to a fifth embodiment of the present invention, the display device including a plurality of rotating reels and structural assembly beyond which the reels extend or protrude.
Figure 9:
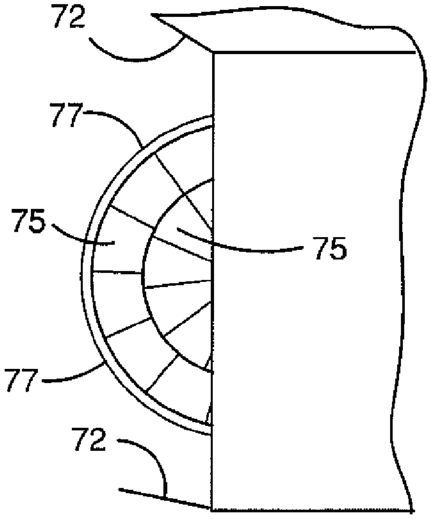
FIG. 9 is a side view of the embodiment shown in FIG. 8.

FIGS. 8 and 9 illustrates perspective and side views of a display device 70 for a gaming machine incorporating a plurality of reels 71 that protrude from a structural assembly in the form of a front face 72 of a gaming machine. Although the front face 72 is contoured and extends forward, the reels 71 protrude and extend beyond an opening formed in the front face or sections of the front face adjacent to the reels 71. In other words, the outer periphery or strip of the reels 71 extends or protrudes beyond at least a portion of the wall section. The reels 71 like the embodiment shown in FIGS. 6 and 7 include a central large diameter reel 76 that is flanked by two side pairs of smaller reels 74. Side walls 75 including marks and other graphical features such as lights and video displays may also be provided. A plastic cover 77 is also disposed over the reels 71.

Those skilled in the art of the present invention will appreciate that many modifications and variations may be made to the embodiments described above without departing from the spirit and scope of the present invention.

For example, reels protruding from a front face of the gaming machine may be of uniform or uneven diameter and may be mounted co-axially or on a separate axis. It is also possible that any one or more of the reels may include a side wall on which additional visuals symbols or markings are provided to further enhance enjoyment for a player of a gaming machine.

According to another example, it is also possible for reels, which are rotated about one or more substantially horizontal axis, to also be rotated about an additional upright axis. An advantage provided by this arrangement is the outcome displayed on both sides of the reels when stopped can be displayed to a player seated on one side of the gaming machine by rotating the reels as a fixed assembly of reels about the upright or vertical axis.

In the claims which follow and in the preceding description of certain embodiments of the invention, except where the context indicates otherwise due to express language or necessary implication, the word "comprise" or variations such as "comprise" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A gaming machine comprising:

i) a plurality of rotating reels having an outer periphery on which images relating to a game being played on the machine are displayed; and ii) a wall section located adjacent to the reels, wherein at least two of the plurality of reels are mounted so that their outer periphery protrudes beyond at least a portion of the wall section adjacent to the reels, wherein the reels can be observed or are visible from opposite sides of the wall section, and wherein the reels can be pivoted about an upright axis so that the front and rear view of the reels can be observed or is visible from one point.

2. The gaming machine according to claim 1, wherein the wall section is in the form of one or more members disposed about the reels.

3. The gaming machine according to claim 2, wherein the wall section is in the form of one or more flat or contoured panels about the panels.

4. The gaming machine according to claim 3, wherein the flat or contoured panels recede backwardly from the protruding periphery of the reels.

5. The gaming machine according to claim 3, wherein the contoured panels extend in part forwardly of the protruding outer periphery of the reels.

6. The gaming machine according to claim 1, wherein the wall section forms at least part of a front face of the gaming machine which obscures from view part of the reels behind the wall section.

7. The gaming machine according to claim 1, wherein the reels extend or protrude from opposite sides of the wall section.

8. The gaming machine according to claim 1, wherein the furthest point of the outer periphery of the reels protrudes past the wall section adjacent to the reels by at least 30 mm, and suitably in the range of 40 to 300 mm.

9. The gaming machine according to claim 1, wherein at least one of the reels has a side wall oriented transversely to its outer periphery and one of the reels having the side wall extends or protrudes beyond at least a portion of the wall section so that at least part of the side wall of the respective reel is visible.

10. The gaming machine according to claim 9, wherein at least two of the reels have at least one side wall of which at least part is visible.

11. The gaming machine according to claim 9, wherein each of the reels include at least one side wall of which at least part is visible.

12. The gaming machine according to claim 9, wherein the reels are arranged in a side-by-side arrangement and the reels located at opposite ends of the arrangement have at least one side wall of which at least part is visible at outer ends of the arrangement of reels.

13. The gaming machine according to claim 9, wherein two of the reels are separated by a space or gap, and at least one of the spaced reels has one of the side walls of which at least a part is visible.

14. The gaming machine according to claim 9, wherein the side walls extend from the edges of the outer periphery.

15. The gaming machine according to claim 9, wherein the side walls include lights, such as multi-coloured light sources or light emitting diodes (LEDs).

16. The gaming machine according to claim 9, wherein the side walls include indicia that corresponds, matches or compliments with symbols on the outer periphery of the reels.

17. The gaming machine according to claim 16, wherein the indicia includes the side walls of the reel being divided into one or more geometric sectors that are aligned with the images on the outer wall.

18. The gaming machine according to claim 9, wherein the reels are arranged in a linear relationship in which the reels are co-axially mounted relative to each other.

19. The gaming machine according to claim 9, wherein the reels are arranged on different axes.

20. The gaming machine according to claim 1, wherein the reels are of uniform diameter.

21. The gaming machine according to claim 1, wherein the reels have at least two different diameters.

22. The gaming machine according to claim 1, comprising a transparent cover having a shape adapted to receive a portion of the reels extending or projecting from the gaming machine disposed over the reels.

23. A gaming machine comprising:

i) a mechanical reel assembly including a plurality of rotatably mounted reels each having an outer periphery from which images are displayed, the reels having a plurality of stop positions for displaying the images to determine outcomes; and ii) a housing for containing the components of a gaming machine on the inside thereof, the housing including a display opening through which the reels protrude so that part of the outer peripheral wall is disposed on an outside of the display opening while rotating and/or when in a stop position, wherein the reels can be observed or are visible from opposite sides of the wall section, and wherein the reels can be pivoted about an upright axis so that the front and rear view of the reels can be observed or is visible from one point.

24. A gaming machine comprising:

i) a mechanical reel assembly including a plurality of rotatably mounted reels each having an outer periphery on which images are displayed, the reels having a plurality of stop positions for displaying the images to determine outcomes; and ii) a structural assembly including two side supports in which one is disposed either end of the reel assembly, the reels protruding or extending past the side supports on opposite sides such that images on opposite sides of the reels can be observed, wherein the reels can be observed or are visible from opposite sides of the wall section, and wherein the reels can be pivoted about an upright axis so that the front and rear view of the reels can be observed or is visible from one point.

* * * * *